(12) United States Patent
Yang et al.

(10) Patent No.: US 9,395,060 B2
(45) Date of Patent: Jul. 19, 2016

(54) GUIDE LAMP APPARATUS FOR VEHICLE

(71) Applicant: Hyundai Motor Company, Seoul (KR)

(72) Inventors: Jeong Gyu Yang, Yongin-si (KR); Hye In Park, Masan-si (KR); Jin Ho Na, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 227 days.

(21) Appl. No.: 14/064,895

(22) Filed: Oct. 28, 2013

(65) Prior Publication Data

US 2015/0023038 A1   Jan. 22, 2015

(30) Foreign Application Priority Data

Jul. 18, 2013  (KR) ........................ 10-2013-0084566

(51) Int. Cl.
| | |
|---|---|
| *F21V 7/00* | (2006.01) |
| *F21S 8/10* | (2006.01) |
| *B60Q 1/22* | (2006.01) |
| *B60Q 1/34* | (2006.01) |
| *B60Q 1/50* | (2006.01) |

(52) U.S. Cl.
CPC . *F21S 48/24* (2013.01); *B60Q 1/22* (2013.01); *B60Q 1/34* (2013.01); *B60Q 1/50* (2013.01); *F21S 48/215* (2013.01); *F21S 48/2212* (2013.01); *F21S 48/234* (2013.01); *B60Q 2400/50* (2013.01)

(58) Field of Classification Search
CPC   F21S 48/1154; F21S 48/1388; F21V 7/0025; F21V 7/0066
USPC .......................... 362/516, 280–284, 297–303
See application file for complete search history.

(56) References Cited

U.S. PATENT DOCUMENTS

| | | | |
|---|---|---|---|
| 6,406,171 B1 | 6/2002 | Satsukawa et al. | |
| 2006/0050251 A1 | 3/2006 | Um | |
| 2013/0155712 A1* | 6/2013 | Kloos | ........................... 362/521 |

FOREIGN PATENT DOCUMENTS

| | | |
|---|---|---|
| JP | 5-325604 A | 12/1993 |
| JP | 2006-66130 A | 3/2006 |
| JP | 2008-155767 A | 7/2008 |
| KR | 1999-019593 A | 3/1999 |

\* cited by examiner

*Primary Examiner* — Sean Gramling
(74) *Attorney, Agent, or Firm* — Morgan, Lewis & Bockius LLP

(57) ABSTRACT

A guide lamp apparatus for a vehicle may include a light source, a side reflector which may be arranged on a lateral side of the light source, form an imaginary light source identical to the light source on a side of the light source, and reflect the light radiated from the light source to be divided into a plurality of lights, and a light collection lens that may be arranged in a front of the light source and collects light from the light source that may be divided into the plurality of lights by the side reflector and forms predetermined patterned images on a road surface.

10 Claims, 3 Drawing Sheets

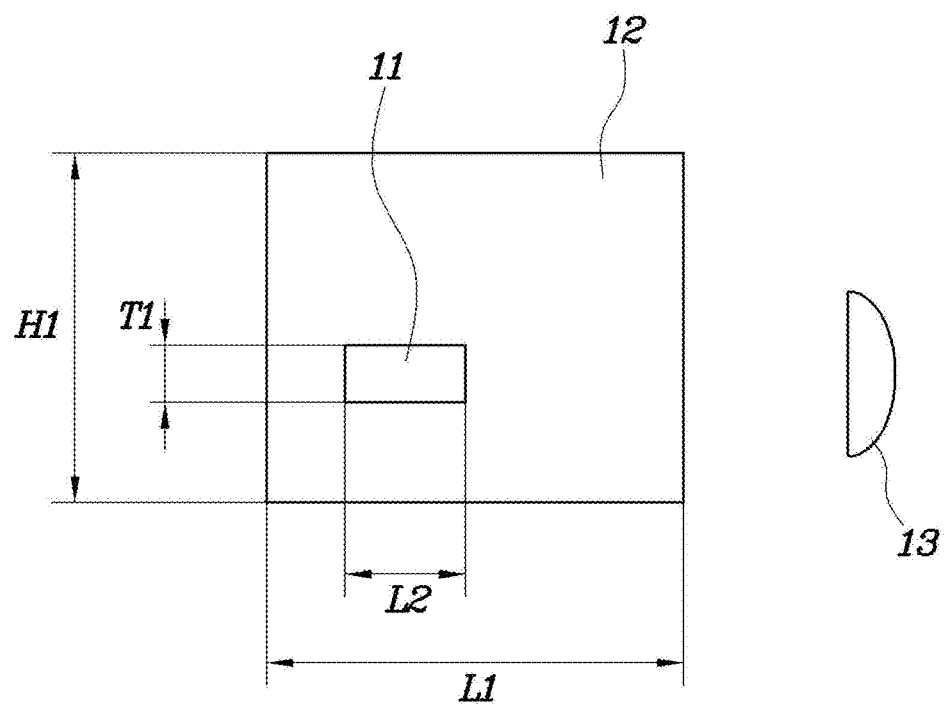

GUIDE LAMP APPARATUS FOR VEHICLE

CROSS-REFERENCE TO RELATED APPLICATION

The present application claims priority to Korean Patent Application No. 10-2013-0084566 filed Jul. 18, 2013, the entire contents of which is incorporated herein for all purposes by this reference.

BACKGROUND

1. Field of the Invention

The present invention relates to a guide lamp apparatus for a vehicle, and more particularly, to a guide lamp apparatus for a vehicle capable of dividing light from one light source into a plurality of light to form patterned images on a road surface when a turn signal guide lamp or a rear-moving guide lamp operates.

2. Description of Related Art

Generally, a guide lamp provided on a vehicle is classified mainly as a turn signal guide lamp and a rear-moving guide lamp wherein the turn signal guide lamp is operated by an operation of a multifunction switch by a driver for serving to notify a lane change or an advancing-direction of a vehicle on a crossway to other vehicles while driving, and the rear-moving guide lamp serves to light a rear of a vehicle when a driver operates a shifting lever to a reverse stage (R) and also to notify an intention to move in reverse to other vehicles that are driving next to or behind a vehicle.

However, according to a guide lamp of a conventional art, the light from a source is illuminated simply outside through a lens and when vehicles moving behind are disposed in a dead zone where drivers of the vehicles that drive on a side or rear of a forward moving vehicle cannot see a guide lamp of the forward moving vehicle, the drivers cannot recognize whether the guide lamp is operating or not, and in a more serious case, the drivers cannot identify the intention of a lane change or a change to a reverse direction of the forward moving vehicle, thereby causing accidents.

The description provided above as a related art of the present invention is only for helping in understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a guide lamp apparatus for a vehicle in which when a driver operates a guide lamp of a vehicle, the light emitted from a light source is divided into a plurality of lights to form predetermined patterned images on a road surface in a direction in which the vehicle is advancing and thus provide obviously the advancing direction for drivers of other vehicles that are driving in the side or rear side of the vehicle, thereby improving safety and reducing accident risk.

In an aspect of the present invention, a guide lamp apparatus for a vehicle, may include a light source, a side reflector which is arranged on a lateral side of the light source, form an imaginary light source identical to the light source on a side of the light source, and reflect the light radiated from the light source to be divided into a plurality of lights, and a light collection lens that is arranged in a front of the light source and collects light from the light source that is divided into the plurality of lights by the side reflector and forms predetermined patterned images on a road surface.

The guide lamp apparatus for the vehicle may further include a lamp housing to which the light source and the side reflector, and the light collection lens are fixed.

The side reflector may include a left reflector and a right reflector, which are arranged symmetrically on both sides of the light source.

The side reflector is a mirror.

A height of the side reflector is greater than a thickness of the light source and a length of the side reflector is greater than a length of the light source wherein the side reflector is shaped as a flat plate, and the height of the side reflector and the thickness of the light source are vertical to a direction that the light source faces the light collection lens, and the length of the side reflector and the length of the light source are horizontal to a direction that the light source faces the light collection lens.

Brightness and sizes of the images formed on the road surface are controlled through adjusting of a distance between the light source and the side reflector, a length of the side reflector and a tilt angle of the side reflector.

The light collection lens is a convex lens.

The light from the light source is divided into three lights through the left reflector and the right reflector to be illuminated on the road surface.

The imaginary light source may include a right imaginary light source produced by the left reflector on an outer part of the right reflector and a left imaginary light source produced by the right reflector on an outer part of the left reflector.

The lamp housing is fixed to a vehicle body, with being directed toward a front, rear, or side of the vehicle wherein the light source, the side reflector and the light collection lens are fixed to the lamp housing, with being tilted at a predetermined angle toward the road surface in order that the light from the light source is divided into the plurality of lights by the side reflector and then is illuminated on the road surface in a direction to which the vehicle advances.

The lamp housing itself is fixed to a vehicle body, with being tilted at a predetermined angle toward the road surface, which is provided with the light source, the side reflector and the light collection lens in order that the light from the light source is divided into the plurality of lights by the side reflector and then is illuminated on the road surface in a direction to which the vehicle advances.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a view showing a side reflector according to an exemplary embodiment of the present invention.

Figure 1:
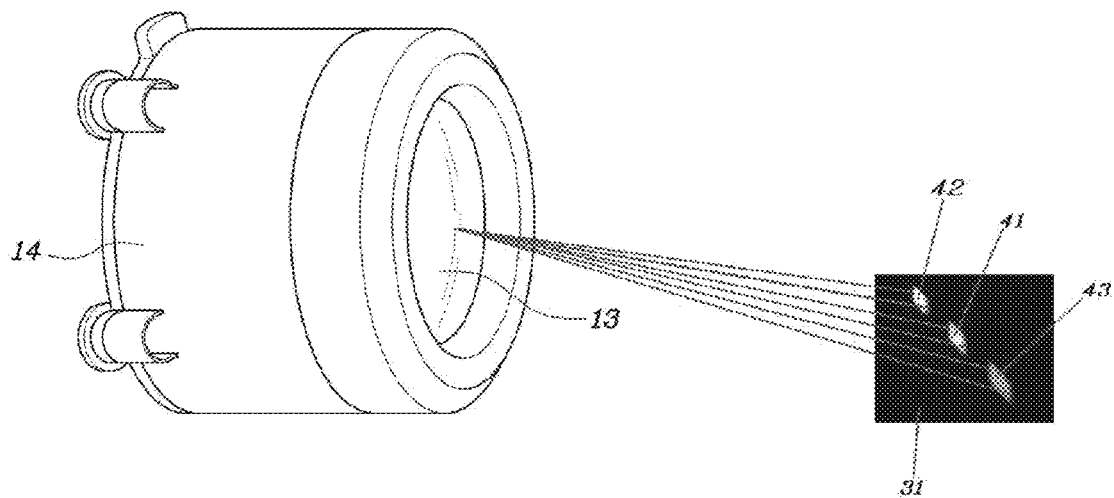
FIGS. 1 and 2 are perspective and cross-sectional views showing a guide lamp apparatus for a vehicle according to an exemplary embodiment of the present invention, respectively, wherein the light from a light source is divided into a plurality of lights to be illuminated on a road surface as predetermined patterned images.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter a guide lamp apparatus for a vehicle according to an exemplary embodiment of the present invention will be described, referring to the accompanying drawings.

Figure 2:
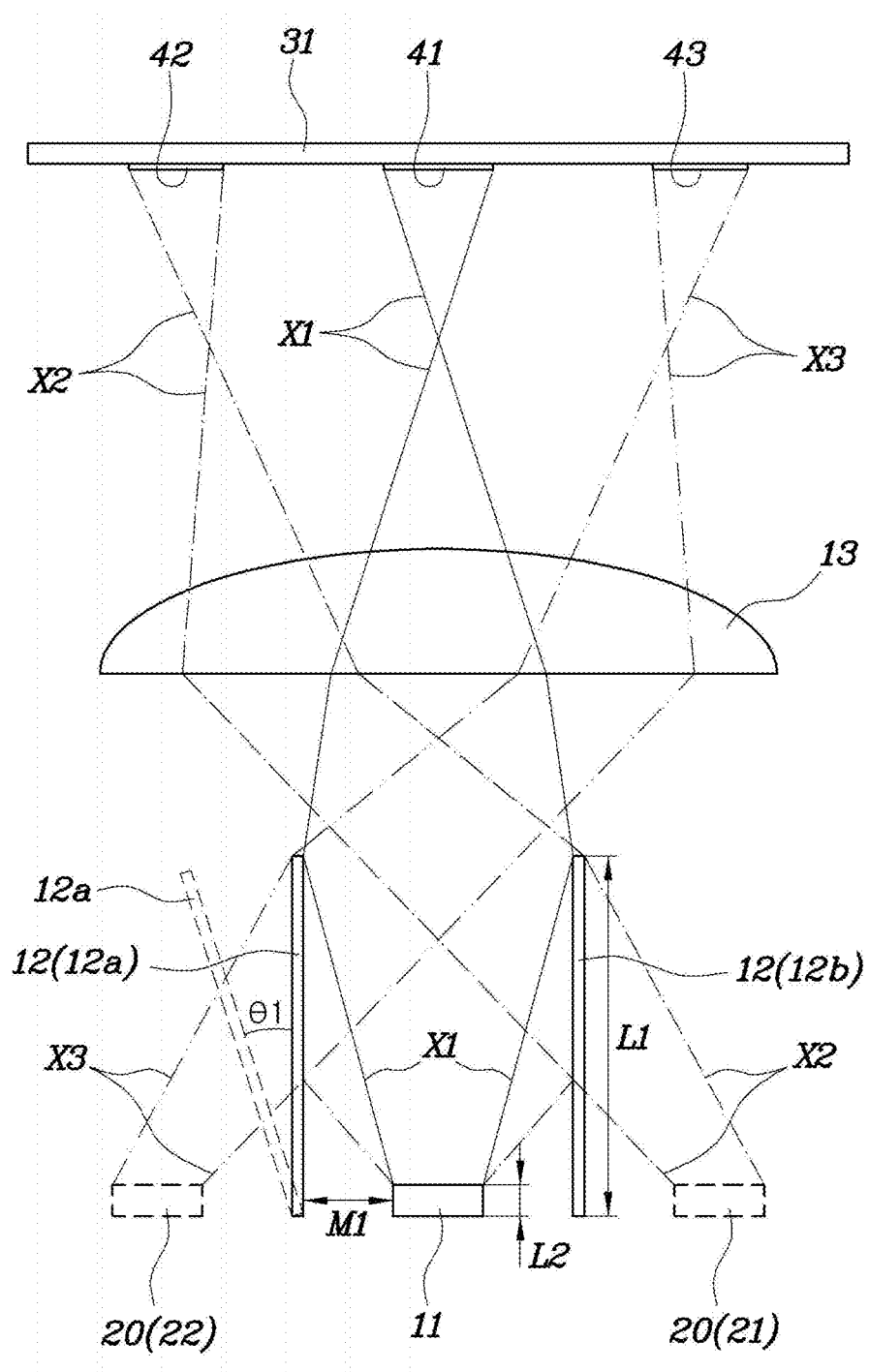

A guide lamp apparatus for a vehicle according to an exemplary embodiment of the present invention, as shown in FIGS. 1 to 3, includes: a LED light source 11, side reflectors 12 which are arranged on both sides of the light source 11, form imaginary light sources 20 identical to the light source 11 on both sides of the light source 11, and reflect the light radiated from the light source 11 to be divided into a plurality of lights, and a light collection lens 13 that is arranged on a front of the light source 11 and collects the light from the light source 11 that is divided into a plurality of light by the side reflector 12 and forms predetermined patterned images 41, 42, 43 on a road surface 31 disposed in a forward direction of a vehicle.

Additionally, the guide lamp apparatus according to an exemplary embodiment of the present invention further includes a lamp housing 14 in which the light source 11, the side reflector 12 and the light collection lens 13 are fixed.

Here, the lamp housing 14 is fixed to a vehicle body, with directed toward a front/rear or a side of a vehicle in order that the light from the light source 11 is divided into a plurality of lights by the side reflector 12 and then is illuminated on the road surface 31 in a direction to which the vehicle advances wherein the light source 11, the side reflector 12 and the light collection lens 13 may be fixed to the lamp housing 14, with tilted at a predetermined angle toward the road surface 31.

Otherwise, the lamp housing 14 itself may be fixed to a vehicle body, with tilted at a predetermined angle toward the road surface 31, which is provided with the light source 11, the side reflector 12 and the light collection lens 13 in order that the light from the light source 11 is divided into a plurality of lights by the side reflector 12 and then is illuminated on the road surface 31 in a direction to which the vehicle advances.

The light collection lens 13 may be convex lenses, and the side reflector may be mirror.

Meanwhile, the side reflector 12 is constituted with a left reflector 12a and a right reflector 12b, which are arranged symmetrically on both sides of the light source 11, wherein distance M1 spaced between the light source 11 and the left reflector 12a may be identical with the distance spaced between the light source 11 and the right reflector 12b.

Here, the spaced distance M1 between the light source 11 and each of the left and right reflectors 12a, 12b is a factor for determining the interval between the images 41, 42, 43 formed on the road surface 31 such that when the left reflector 12a and the right reflector 12b are spaced from the light source 11 at a same interval, the intervals among the images 41, 42, 43 formed on the road surface 31 become to be same.

Meanwhile, a height H1 of the side reflector 12 is greater than a thickness T1 of the light source 11 and a length L1 of the side reflector 12 is greater than a length L2 of the light source 11 wherein the side reflector may be shaped as a large flat plate in order for the side reflector 12 to reflect easily the light from the light source 11.

Here, the height H1 of the side reflector 12 and the thickness T1 of the light source 11 are vertical to a direction that the light source 11 faces the light collection lens 13, and the length L1 of the side reflector 12 and the length L2 of the light source 11 are horizontal to a direction that the light source 11 faces the light collection lens 13.

According to the guide lamp apparatus for a vehicle of the present invention, the brightness and sizes of the images 41, 42, 43 formed on the road surface 31 can be controlled through adjusting of the distance M1 between the light source 11 and the side reflector 12, the length L1 of the side reflector 12 and a tilt angle θ1 of the side reflector 12.

That is, the longer the distance M1 between the light source 11 and the side reflector 12 becomes, the wider the intervals among the images 41, 42, 43 formed on the road surface 31 become, and the longer the length L1 of the side reflector 12 becomes, the brighter the images 41, 42, 43 formed on the road surface 31, and the greater the tilt angle θ1 of the side reflector 12 becomes, the brighter and larger the images 41, 42, 43 formed on the road surface 31.

Meanwhile, the imaginary light source 20 according to an exemplary embodiment of the present invention is constituted with a right imaginary light source 21 produced by the left reflector 12a on an outer part of the right reflector 12b and a left imaginary light source 22 produced by the right reflector 12b on an outer part of the left reflector 12a.

Further, the light from the light source 11 is divided into three lights by the left reflector 12a and the right reflector 12b to be illuminated on the road surface 31, and as a result three images 41, 42, 43 are formed with the three divided light (light division) from the light source 11 on the road surface 31.

Hereinafter, an operation of the guide lamp apparatus for a vehicle according to an exemplary embodiment of the present invention will be described.

When the left reflector 12a and the right reflector 12b are arranged on both sides of a LED light source 11, the right imaginary light source 21 reflected by the left reflector 12a is produced on an outer part of the right reflector 12b and the left imaginary light source 22 reflected by the right reflector 12b is produced on an outer part of the left reflector 12a.

That is, the right imaginary light source 21 and the left imaginary light source 22 are produced by the left reflector 12a and the right reflector 12b through one light source 11, which are the same shape as the light source 11.

The light incident directly to a center of the light collection lens 13 (path X1 in FIG. 2), not being reflected by the left reflector 12a and the right reflector 12b, among the lights radiated from the light source 11, is collected and refracted through the light collection lens 13 and then formed as a first image 41 on the road surface 31.

Furthermore, the light reflected by the right reflector 12b among the lights radiated from the light source 11 and the light radiated from the right imaginary light source 21 are collected and refracted on a left side of the light collection lens 13 through a path X2 and then formed as a second image 42 on the road surface 31 disposed on a left side of the first image 41.

In addition, the light reflected by the left reflector 12a among the lights radiated from the light source 11 and the light radiated from the left imaginary light source 22 are collected and refracted on a right side of the light collection lens 13 through a path X3 and then formed as a third image 43 on the road surface 31 disposed on a right side of the first image 41.

For reference, the right drawing of FIG. 1 is an actual picture showing that the light from the light source 11 is divided into three lights by the left reflector 12a and the right reflector 12b to form three images 41, 42, 43 on the road surface 31.

According to the guide lamp apparatus of the exemplary embodiment of the present invention, the images 41, 42, 43 divided into a plurality of images are formed on the road surface 31 in a direction to which a vehicle advances by using one light source 11, and thus other drivers of vehicles that drive at a side or rear can identify easily the forward direction of the vehicle by seeing the predetermined patterned images 41, 42, 43 formed on the road surface 31.

That is, when a turn signal guide lamp is operated for changing lanes or going through a crossway, or a reverse moving guide lamp is operated for driving in reverse, the light from the light source 11 is divided into a plurality (three) of lights while reflected by the side reflector 12 to form a plurality of images 41, 42, 43 on the road surface 31 that is disposed in the forward direction of a vehicle.

Accordingly, even when other vehicles are disposed in a dead zone where the drivers of the other vehicles that drive on a side/rear of a forward moving vehicle cannot see directly the signal guide lamp or a reverse-moving guide lamp of the forward moving vehicle, the drivers of the other vehicles can identify the intention of the lane changing or the reverse moving of the driver by seeing the specific images 41, 42, 43 formed on the road surface 31, thereby improving safety and preventing an accident of the vehicle.

According to an exemplary embodiment of the present invention, the light from one light source is divided into a plurality of lights while reflected by the side reflector to form a plurality of images on a road surface in a direction to which a vehicle advances so that the drivers of the other vehicles that drive on a side/rear of a forward moving vehicle can identify the intention of the lane changing or the reverse moving of the driver with seeing the predetermined patterned images formed on the road surface, thereby improving safety and reducing risk of an accident of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A guide lamp apparatus for a vehicle, comprising:
    a light source;
    a side reflector arranged on a lateral side of the light source, forming an imaginary light source identical to the light source on a side of the light source, and reflecting the light radiated from the light source to be divided into a plurality of lights; and
    a light collection lens arranged in front of the light source and collecting light from the light source divided into the plurality of lights by the side reflector and forming predetermined patterned images on a road surface,
    wherein brightness and sizes of the images formed on the road surface are controlled through adjusting of a distance between the light source and the side reflector, a length of the side reflector and a tilt angle of the side reflector.

2. The guide lamp apparatus for the vehicle of claim 1, further including a lamp housing to which the light source and the side reflector, and the light collection lens are fixed.

3. The guide lamp apparatus for the vehicle of claim 1, wherein the side reflector includes a left reflector and a right reflector, arranged symmetrically on both sides of the light source.

4. The guide lamp apparatus for the vehicle of claim 1, wherein the side reflector is a mirror.

5. The guide lamp apparatus for the vehicle of claim 1, wherein a height of the side reflector is greater than a thickness of the light source and a length of the side reflector is greater than a length of the light source wherein the side reflector is a flat plate, and the height of the side reflector and the thickness of the light source are vertical to a direction that the light source faces the light collection lens, and the length of the side reflector and the length of the light source are horizontal to a direction that the light source faces the light collection lens.

6. The guide lamp apparatus for the vehicle of claim 1, wherein the light collection lens is a convex lens.

7. The guide lamp apparatus for the vehicle of claim 3, wherein the light from the light source is divided into three lights through the left reflector and the right reflector to be illuminated on the road surface.

8. The guide lamp apparatus for the vehicle of claim 3, wherein the imaginary light source includes a right imaginary light source produced by the left reflector on an outer part of the right reflector and a left imaginary light source produced by the right reflector on an outer part of the left reflector.

9. The guide lamp apparatus for the vehicle of claim 2, wherein the lamp housing is fixed to a vehicle body, with being directed toward a front, rear, or side of the vehicle wherein the light source, the side reflector and the light collection lens are fixed to the lamp housing, with being tilted at a predetermined angle toward the road surface such that the light from the light source is divided into the plurality of lights by the side reflector and then is illuminated on the road surface in a direction to in which the vehicle advances.

10. The guide lamp apparatus for the vehicle of claim 2, wherein the lamp housing itself is fixed to a vehicle body, with being tilted at a predetermined angle toward the road surface, which is provided with the light source, the side reflector and the light collection lens in order that the light from the light source is divided into the plurality of lights by the side reflector and then is illuminated on the road surface in a direction which the vehicle advances.

* * * * *